(12) United States Patent
Schrieber et al.

(10) Patent No.: US 12,537,862 B2
(45) Date of Patent: Jan. 27, 2026

(54) METHOD AND SYSTEM FOR PROVIDING SECURE CONVERSATION GATEWAY

(71) Applicant: JPMorgan Chase Bank, N.A., New York, NY (US)

(72) Inventors: Stephanie J Schrieber, Galena, OH (US); Thomas Helfand, Lucas, TX (US); Nikhil Dhoble, Plano, TX (US); Matthew D Matheny, Mount Vernon, OH (US); David A Butler, Philadelphia, PA (US); Stephen Johnson, New Albany, OH (US); Robert C Buchser, Blacklick, OH (US); Ravi Kappagantu, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 52 days.

(21) Appl. No.: 17/872,482

(22) Filed: Jul. 25, 2022

(65) Prior Publication Data
US 2023/0029645 A1    Feb. 2, 2023

(30) Foreign Application Priority Data
Jul. 27, 2021   (IN) .............................. 202111033639

(51) Int. Cl.
*H04L 65/1023* (2022.01)
*H04L 65/1096* (2022.01)
*H04L 65/1104* (2022.01)
*H04L 65/75* (2022.01)

(52) U.S. Cl.
CPC ...... *H04L 65/1023* (2013.01); *H04L 65/1096* (2013.01); *H04L 65/1104* (2022.05); *H04L 65/75* (2022.05)

(58) Field of Classification Search
CPC . H04L 65/1023; H04L 65/1104; H04L 65/75; H04L 65/1096; H04L 65/765; H04L 65/103
See application file for complete search history.

(56) References Cited

U.S. PATENT DOCUMENTS 11,005,988 B1 * 5/2021 Patakokila .......... H04M 3/4286
11,431,770 B2 * 8/2022 Huang .................... H04L 65/75
(Continued)

*Primary Examiner* — Nicholas R Taylor
*Assistant Examiner* — Angela Widhalm De Rodriguez
(74) *Attorney, Agent, or Firm* — GREENBLUM & BERNSTEIN, P.L.C.

(57) ABSTRACT

Systems and methods for providing a secure conversation gateway by which an audio voice stream is made to be replicable and convertible into other media types are provided. The method includes receiving an audio voice data stream; converting the received audio voice data stream into a predetermined media format; and transmitting the converted audio data stream to a user. The method may also include receiving an interaction event that corresponds to the audio data stream; generating metadata based on the interaction event; and applying a machine learning algorithm to the audio data stream and the metadata in order to generate a response that relates to the audio data stream. The method may also include replicating the audio data stream and distributing copies thereof to a set of recipients.

15 Claims, 5 Drawing Sheets

(56) References Cited

U.S. PATENT DOCUMENTS

| | | | |
|---|---|---|---|
| 2005/0286496 A1* | 12/2005 | Malhotra | H04L 65/1106 370/352 |
| 2009/0204906 A1* | 8/2009 | Irving | H04N 7/15 715/753 |
| 2010/0085959 A1* | 4/2010 | Vohra | H04L 65/1036 709/228 |
| 2010/0195814 A1* | 8/2010 | Gao | H04M 3/4285 379/266.01 |
| 2011/0122863 A1* | 5/2011 | Balasaygun | H04L 65/1083 370/352 |
| 2013/0329724 A1* | 12/2013 | Yamamoto | H04L 65/1096 370/352 |
| 2016/0227029 A1* | 8/2016 | Wolfeld | H04M 7/0084 |
| 2018/0261203 A1* | 9/2018 | Zoller | H04L 51/02 |
| 2018/0284957 A1* | 10/2018 | Afsari | H04L 65/403 |
| 2020/0106809 A1* | 4/2020 | Raj | H04L 63/0428 |
| 2020/0162796 A1* | 5/2020 | Azuolas | H04N 21/23106 |
| 2020/0302934 A1* | 9/2020 | Peters | G10L 15/30 |
| 2021/0051231 A1* | 2/2021 | Cohen | H04N 9/8205 |
| 2022/0116428 A1* | 4/2022 | Aigner | H04L 65/1094 |
| 2022/0337651 A1* | 10/2022 | Al-Dahleh | G10L 19/167 |

* cited by examiner

METHOD AND SYSTEM FOR PROVIDING SECURE CONVERSATION GATEWAY

CROSS-REFERENCE TO RELATED APPLICATIONS

This application claims priority benefit from Indian Application No. 202111033639, filed Jul. 27, 2021, which is hereby incorporated by reference in its entirety.

BACKGROUND

1. Field of the Disclosure

This technology generally relates to methods and systems for handling voice calls and messages, and more particularly, to methods and systems for providing a secure conversation gateway by which an audio voice stream is made to be replicable and convertible into other media types.

2. Background Information

For an organization that handles a relatively large volume of voice calls and messages, there is a need to process the voice calls into audio streams. A standard technology that is widely used for this purpose is known as the Session Initiation Protocol (SIP) Recording Protocol (SIPREC).

The SIPREC standard imposes limitations on how an audio stream may be processed in real time, including limitations on the replicability of the audio stream in real time. Thus, when there is a need to distribute a SIPREC audio stream to multiple users for downstream processing in real time, these limitations may hinder the ability to process the stream.

Accordingly, there is a need for a method for a capability to increase a number of real time audio streams and to facilitate downstream processing of audio streams in an efficient, accurate, and secure manner.

SUMMARY

The present disclosure, through one or more of its various aspects, embodiments, and/or specific features or sub-components, provides, inter alia, various systems, servers, devices, methods, media, programs, and platforms for providing a secure conversation gateway by which an audio voice stream is made to be replicable and convertible into other media types.

According to an aspect of the present disclosure, a method for providing a secure conversation gateway is provided. The method includes: receiving, by the at least one processor, an audio voice data stream; converting, by the at least one processor, the received audio voice data stream into a first predetermined media format; and transmitting, by the at least one processor, the converted audio voice data stream to a user.

The first predetermined media format may include at least one from among a Google Remote Procedure Call (gRPC) format, a Real-Time Protocol (RTP) format, a Secure Real-Time Protocol (SRTP) format, and a Web Real-Time Communication (WebRTC) format.

The method may further include: identifying, by the at least one processor, an interaction event that corresponds to content included in the received audio voice data stream; generating, by the at least one processor, a first set of metadata based on the received interaction event; and applying a machine learning algorithm to the received audio voice data stream and the generated first set of metadata in order to generate a response that relates to the received interaction event.

The interaction event may include at least one from among a customer service request, a customer complaint, and a debt collection.

The method may further include: determining, by the at least one processor, that the received audio voice data stream conforms with a Session Initiation Protocol (SIP) Recording (SIPREC) protocol; determining, by the at least one processor, a number of potential recipients of the received audio voice data stream, the number being less than or equal to four (4); replicating, by the at least one processor, the received audio voice data stream into at least the determined number of copies; and transmitting, by the at least one processor, the replicated copies of the received audio voice data stream to each of the potential recipients.

The method may further include: determining, by the at least one processor, a number of potential recipients of the received audio voice data stream, the number being greater than four (4); replicating, by the at least one processor, the received audio voice data stream into at least the determined number of copies; and transmitting, by the at least one processor, the replicated copies of the received audio voice data stream to each of the potential recipients.

The method may further include: receiving, from a voice call specialist while the received audio voice data stream is being played, a first request to pause a playing of the received audio voice data stream; pausing the playing of the received audio stream in response to the first request; receiving, from the voice call specialist after the playing of the received audio voice data stream has been paused, a second request to resume the playing of the received audio voice data stream; and resuming the playing of the received audio voice data stream in response to the second request.

The method may further include: segmenting, by the at least one processor, the received audio voice data stream into a plurality of audio channels; and synchronizing, by the at least one processor, each respective channel from among the plurality of audio channels with a corresponding event that relates to an ongoing communication associated with the respective channel.

The corresponding event may include at least one from among conferencing, transferring, and a consult.

According to another exemplary embodiment, a computing apparatus for providing a secure conversation gateway is provided. The computing apparatus includes a processor; a memory; and a communication interface coupled to each of the processor and the memory. The processor is configured to: receive, via the communication interface, an audio voice data stream; convert the received audio voice data stream into a first predetermined media format; and transmit, via the communication interface, the converted audio voice data stream to a user.

The first predetermined media format may include at least one from among a Google Remote Procedure Call (gRPC) format, a Real-Time Protocol (RTP) format, a Secure Real-Time Protocol (SRTP) format, and a Web Real-Time Communication (WebRTC) format.

The processor may be further configured to: identify an interaction event that corresponds to content included in the received audio voice data stream; generate a first set of metadata based on the received interaction event; and apply a machine learning algorithm to the received audio voice data stream and the generated first set of metadata in order to generate a response that relates to the received interaction event.

The interaction event may include at least one from among a customer service request, a customer complaint, and a debt collection.

The processor may be further configured to: determine that the received audio voice data stream conforms with a Session Initiation Protocol (SIP) Recording (SIPREC) protocol; determine a number of potential recipients of the received audio voice data stream, the number being less than or equal to four (4); replicate the received audio voice data stream into at least the determined number of copies; and transmit, via the communication interface, the replicated copies of the received audio voice data stream to each of the potential recipients.

The processor may be further configured to: determine a number of potential recipients of the received audio voice data stream, the number being greater than four (4); replicate the received audio voice data stream into at least the determined number of copies; and transmit, via the communication interface, the replicated copies of the received audio voice data stream to each of the potential recipients.

The processor may be further configured to: receive, from a voice call specialist while the received audio voice data stream is being played, a first request to pause a playing of the received audio voice data stream; pause the playing of the received audio stream in response to the first request; receive, from the voice call specialist after the playing of the received audio voice data stream has been paused, a second request to resume the playing of the received audio voice data stream; and resume the playing of the received audio voice data stream in response to the second request.

The processor may be further configured to: segment the received audio voice data stream into a plurality of audio channels; and synchronize each respective channel from among the plurality of audio channels with a corresponding event that relates to an ongoing communication associated with the respective channel.

The corresponding event may include at least one from among conferencing, transferring, and a consult.

According to yet another exemplary embodiment, a non-transitory computer readable storage medium storing instructions for providing a secure conversation gateway is provided. The storage medium includes executable code which, when executed by a processor, causes the processor to: receive an audio voice data stream; convert the received audio voice data stream into a first predetermined media format; and transmit the converted audio voice data stream to a user.

The first predetermined media format may include at least one from among a Google Remote Procedure Call (gRPC) format, a Real-Time Protocol (RTP) format, a Secure Real-Time Protocol (SRTP) format, and a Web Real-Time Communication (WebRTC) format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
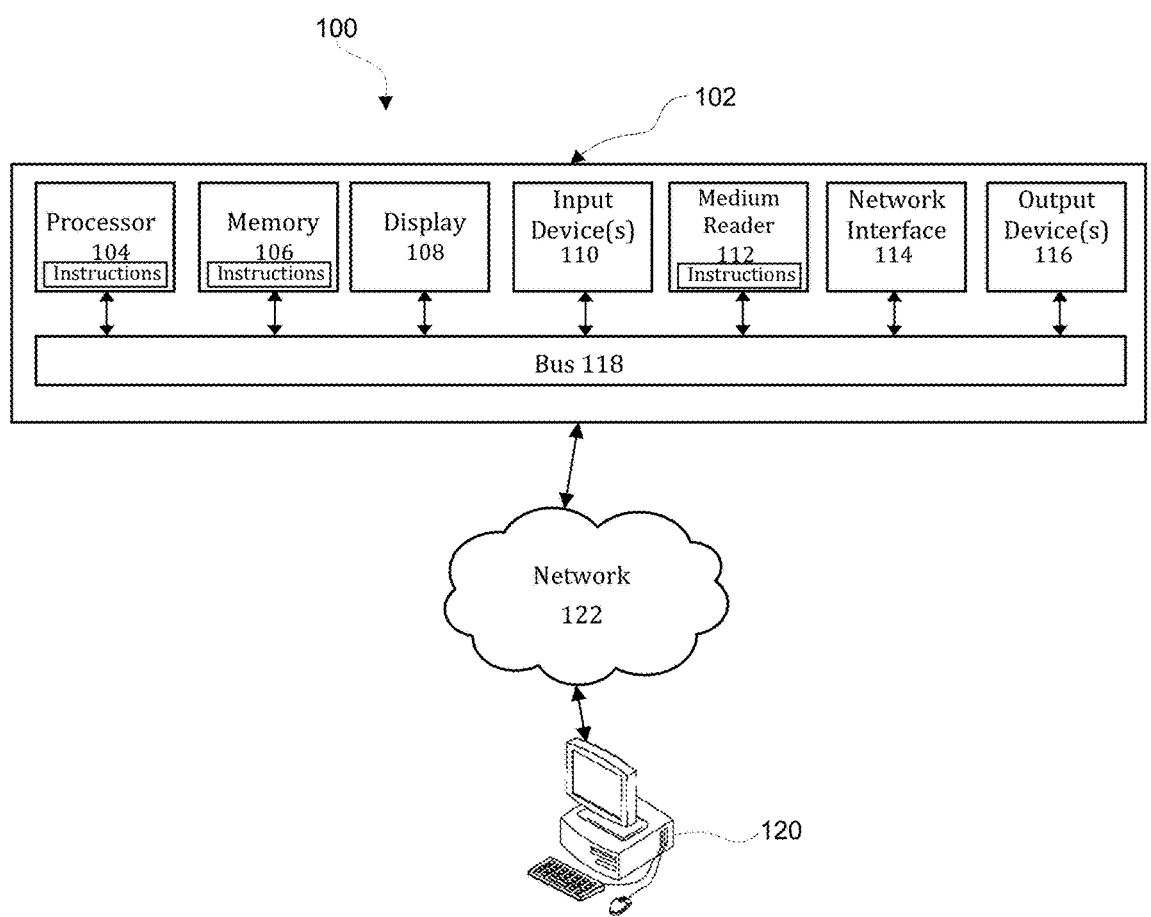
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for providing a secure conversation gateway by which an audio voice stream is made to be replicable and convertible into other media types.

Figure 2:
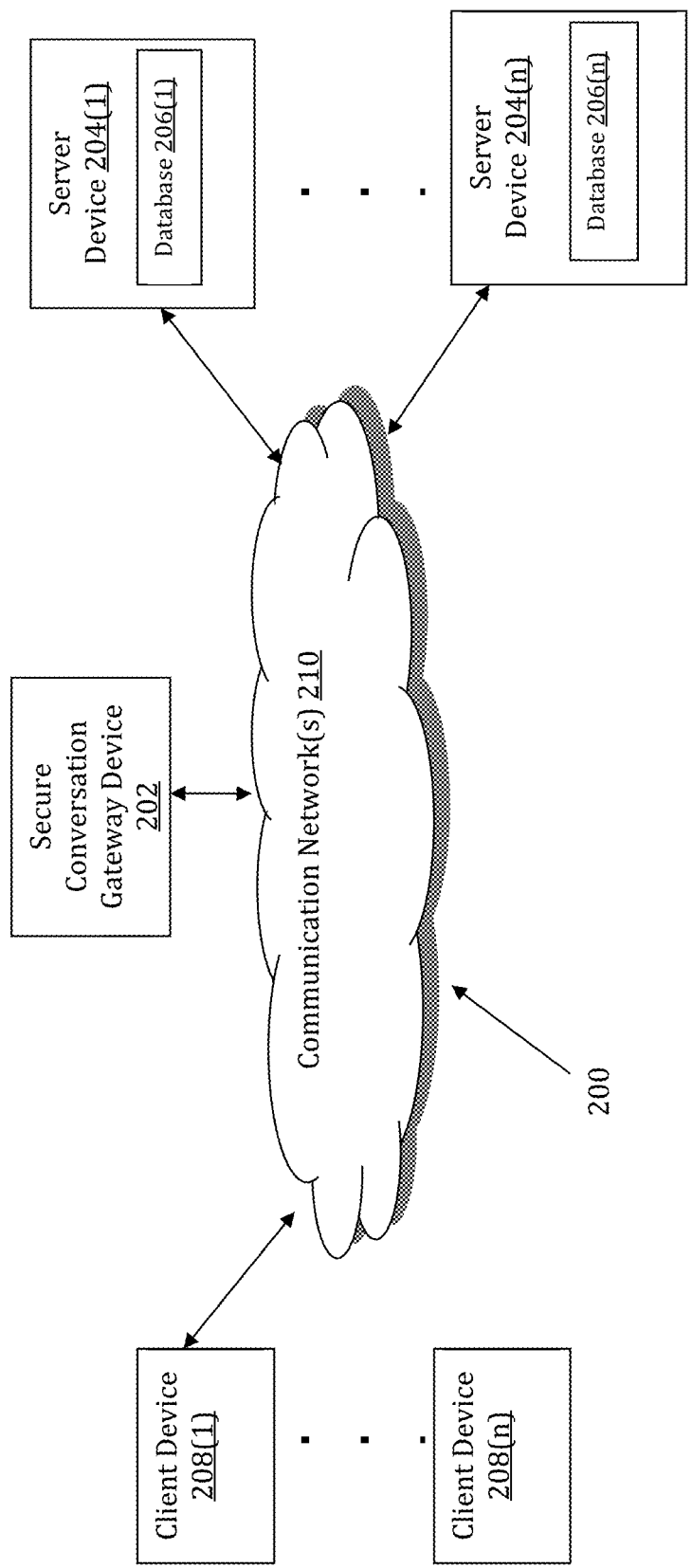
FIG. 2 illustrates an exemplary diagram of a network environment.

Referring to FIG. 2, a schematic of an exemplary network environment 200 for implementing a method for providing a secure conversation gateway by which an audio voice stream is made to be replicable and convertible into other media types is illustrated. In an exemplary embodiment, the method is executable on any networked computer platform, such as, for example, a personal computer (PC).

The method for providing a secure conversation gateway by which an audio voice stream is made to be replicable and convertible into other media types may be implemented by a Secure Conversation Gateway (SCG) device 202. The SCG device 202 may be the same or similar to the computer system 102 as described with respect to FIG. 1. The SCG device 202 may store one or more applications that can include executable instructions that, when executed by the SCG device 202, cause the SCG device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SCG device 202 itself, may be located in virtual server(s) running in a cloud-based computing environment rather than being tied to one or more specific physical network computing devices. Also, the application(s) may be running in one or more virtual machines (VMs) executing on the SCG device 202. Additionally, in one or more embodiments of this technology, virtual machine(s) running on the SCG device 202 may be managed or supervised by a hypervisor.

In the network environment 200 of FIG. 2, the SCG device 202 is coupled to a plurality of server devices 204(1)-204(n) that hosts a plurality of databases 206(1)-206(n), and also to a plurality of client devices 208(1)-208(n) via communication network(s) 210. A communication interface of the SCG device 202, such as the network interface 114 of the computer system 102 of FIG. 1, operatively couples and communicates between the SCG device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCG device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SCG devices that efficiently implement a method for providing a secure conversation gateway by which an audio voice stream is made to be replicable and convertible into other media types.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SCG device 202 may be a standalone device or integrated with one or more other devices or apparatuses, such as one or more of the server devices 204(1)-204(n), for example. In one particular example, the SCG device 202 may include or be hosted by one of the server devices 204(1)-204(n), and other arrangements are also possible. Moreover, one or more of the devices of the SCG device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SCG device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206

(*n*) that are configured to store audio stream data, voice biometric data, metadata that relates to the audio stream data, and any other data that is usable for replicating audio stream data and/or converting audio stream data into other media types.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208(1)-208(*n*) in this example may include any type of computing device that can interact with the SCG device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the SCG device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the SCG device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SCG device 202, the server devices 204(1)-204(*n*), or the client devices 208(1)-208(*n*), for example, may be configured to operate as virtual instances on the same physical machine. In other words, one or more of the SCG device 202, the server devices 204(1)-204(*n*), or the client devices 208(1)-208(*n*) may operate on the same physical device rather than as separate devices communicating through communication network(s) 210. Additionally, there may be more or fewer SCG devices 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
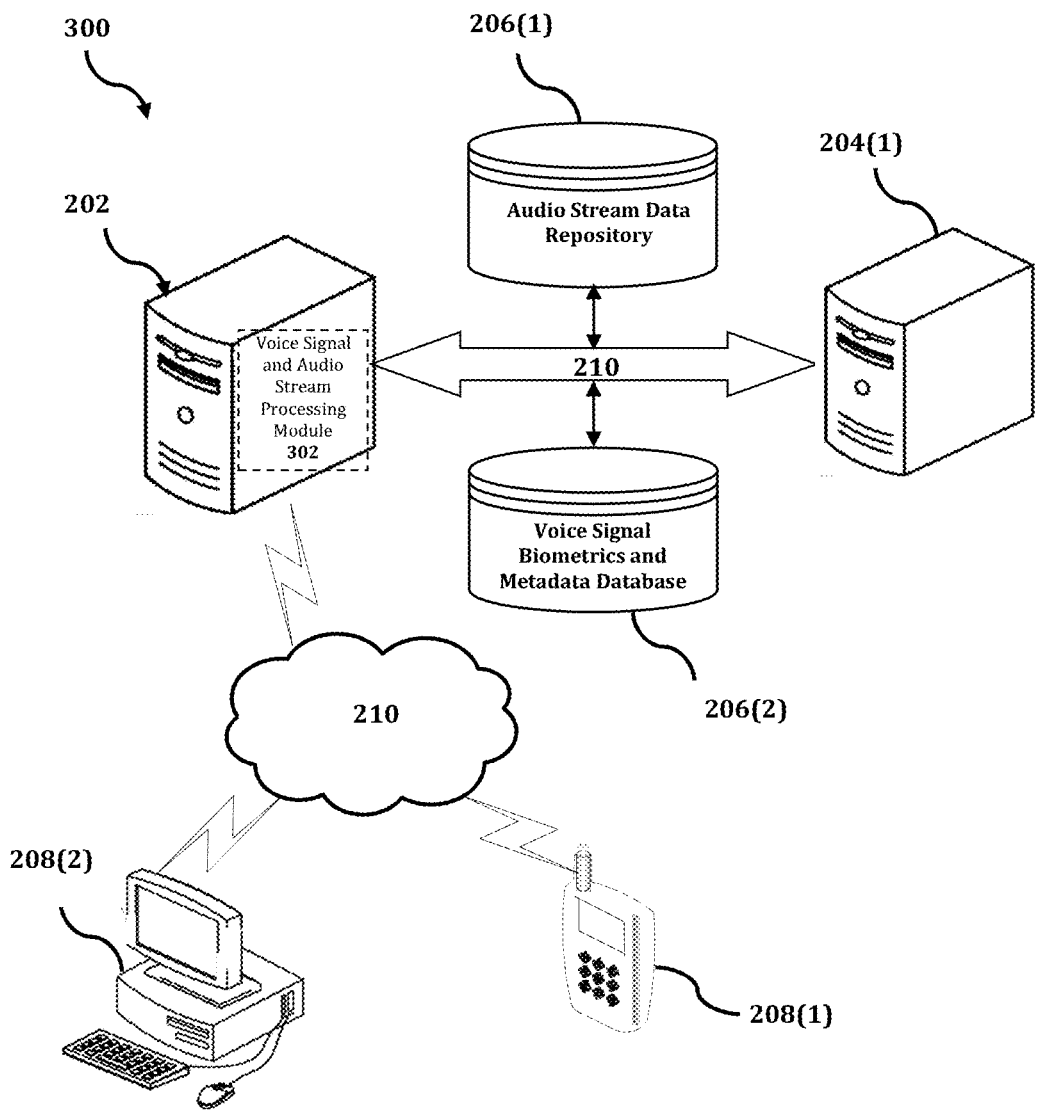
FIG. 3 shows an exemplary system for implementing a method for providing a secure conversation gateway by which an audio voice stream is made to be replicable and convertible into other media types.

The SCG device 202 is described and shown in FIG. 3 as including a voice signal and audio stream processing module 302, although it may include other rules, policies, modules, databases, or applications, for example. As will be described below, the voice signal and audio stream processing module 302 is configured to implement a method for providing a secure conversation gateway by which an audio voice stream is made to be replicable and convertible into other media types in an automated, efficient, scalable, and reliable manner.

An exemplary process 300 for implementing a method for providing a secure conversation gateway by which an audio voice stream is made to be replicable and convertible into other media types by utilizing the network environment of FIG. 2 is shown as being executed in FIG. 3. Specifically, a first client device 208(1) and a second client device 208(2) are illustrated as being in communication with SCG device 202. In this regard, the first client device 208(1) and the second client device 208(2) may be "clients" of the SCG device 202 and are described herein as such. Nevertheless, it is to be known and understood that the first client device 208(1) and/or the second client device 208(2) need not necessarily be "clients" of the SCG device 202, or any entity described in association therewith herein. Any additional or alternative relationship may exist between either or both of the first client device 208(1) and the second client device 208(2) and the SCG device 202, or no relationship may exist.

Further, SCG device 202 is illustrated as being able to access an audio stream data repository 206(1) and a voice signal biometrics and metadata database 206(2). The voice signal and audio stream processing module 302 may be configured to access these databases for implementing a method for providing a secure conversation gateway by which an audio voice stream is made to be replicable and convertible into other media types.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SCG device 202 via broadband or cellular communication. Of course, these embodiments are merely exemplary and are not limiting or exhaustive.

Upon being started, the voice signal and audio stream processing module 302 executes a process for providing a secure conversation gateway by which an audio voice stream is made to be replicable and convertible into other media types. An exemplary process for providing a secure conversation gateway by which an audio voice stream is made to be replicable and convertible into other media types is generally indicated at flowchart 400 in FIG. 4.

Figure 4:
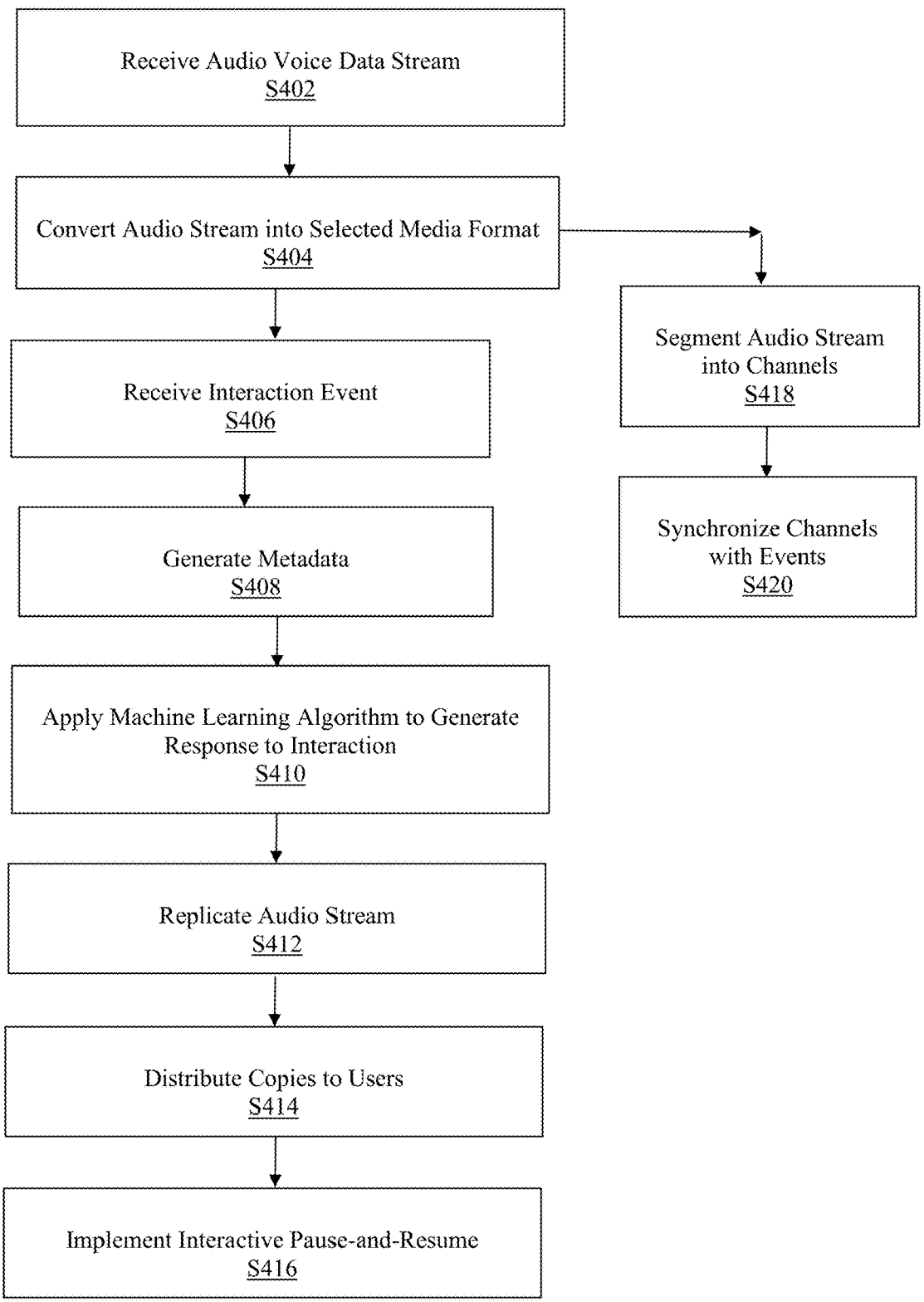
FIG. 4 is a flowchart of an exemplary process for implementing a method for providing a secure conversation gateway by which an audio voice stream is made to be replicable and convertible into other media types.

In the process 400 of FIG. 4, at step S402, the voice signal and audio stream processing module 302 receives an audio voice data stream to be processed. In an exemplary embodiment, the audio voice data stream may correspond to a voice call that is received from a customer. For example, when such a voice call is received by a financial institution such as a bank, the audio voice data stream may correspond to any one or more of a customer service request, a customer complaint, and/or a customer call that relates to a debt collection.

At step S404, the voice signal and audio stream processing module 302 converts the received audio voice data stream into at least one predetermined media format. In an exemplary embodiment, the predetermined media format may include any one or more of a Google Remote Procedure Call (gPRC) format, a Real-Time Protocol (RTP) format, a Secure Real-Time Protocol (SRTP) format, and a Web Real-Time Communication (WebRTC) format.

At step S406, the voice signal and audio stream processing module 302 identifies an interaction event that corresponds to content included in the audio voice data stream. For example, when the audio voice data stream is received at step S402 as a voice call by a financial institution such as a bank, and the audio voice data stream includes content that corresponds to a customer service request, a customer complaint, or a customer call that relates to a debt collection, the interaction event may be an action that relates to the service request, the complaint, or the debt collection.

At step S408, the voice signal and audio stream processing module 302 generates metadata based on the interaction event. Then, at step S410, the voice signal and audio stream processing module 302 applies a machine learning algorithm to the audio voice data stream and the metadata in order to generate a response to the interaction event. The use of the machine learning algorithm leverages historical data that is used for training the algorithm in order to provide a mechanism for generating an accurate and effective response to the interaction event.

At step S412, the voice signal and audio stream processing module 302 replicates the audio voice data stream to generate a number of copies thereof that corresponds to a number of potential recipients. Then, at step S414, the replicated copies are distributed to those recipients. In an exemplary embodiment, the audio voice data stream may conform with the Session Initiation Protocol (SIP) Recording (SIPREC) protocol, and in this case, the usual limitation on the number of SIPREC paths for ingestion to downstream voice enabled applications is four (4). However, the voice signal and audio stream processing module may determine that the number of potential recipients is greater than 4, i.e., the number may be 5, 10, 50, 100, or any other number, and may thus replicate the audio voice data stream to ensure that copies thereof are available for distribution.

At step S416, the voice signal and audio stream processing module 302 implements an interactive pause-and-resume functionality. This functionality enables a user, such as a voice call specialist, to interact with a playing of the audio voice data stream by first pausing the playing thereof, in response to a request from the voice call specialist, and then resuming the playing thereof, in response to a subsequent request. As a result, the specialist can control the pausing and resuming of the playing of the audio voice data stream at will.

At step S418, the voice signal and audio stream processing module 302 segments the audio voice data stream into various channels. The use of the various channels may result from a complex call scenario that relates to conferencing, transferring, and or consults pertaining to the voice call. Then, at step S420, the voice signal and audio stream processing module 302 may synchronize each of the various channels with a corresponding call event, in order to facilitate complex call controls that relate to the particular scenario.

Figure 5:
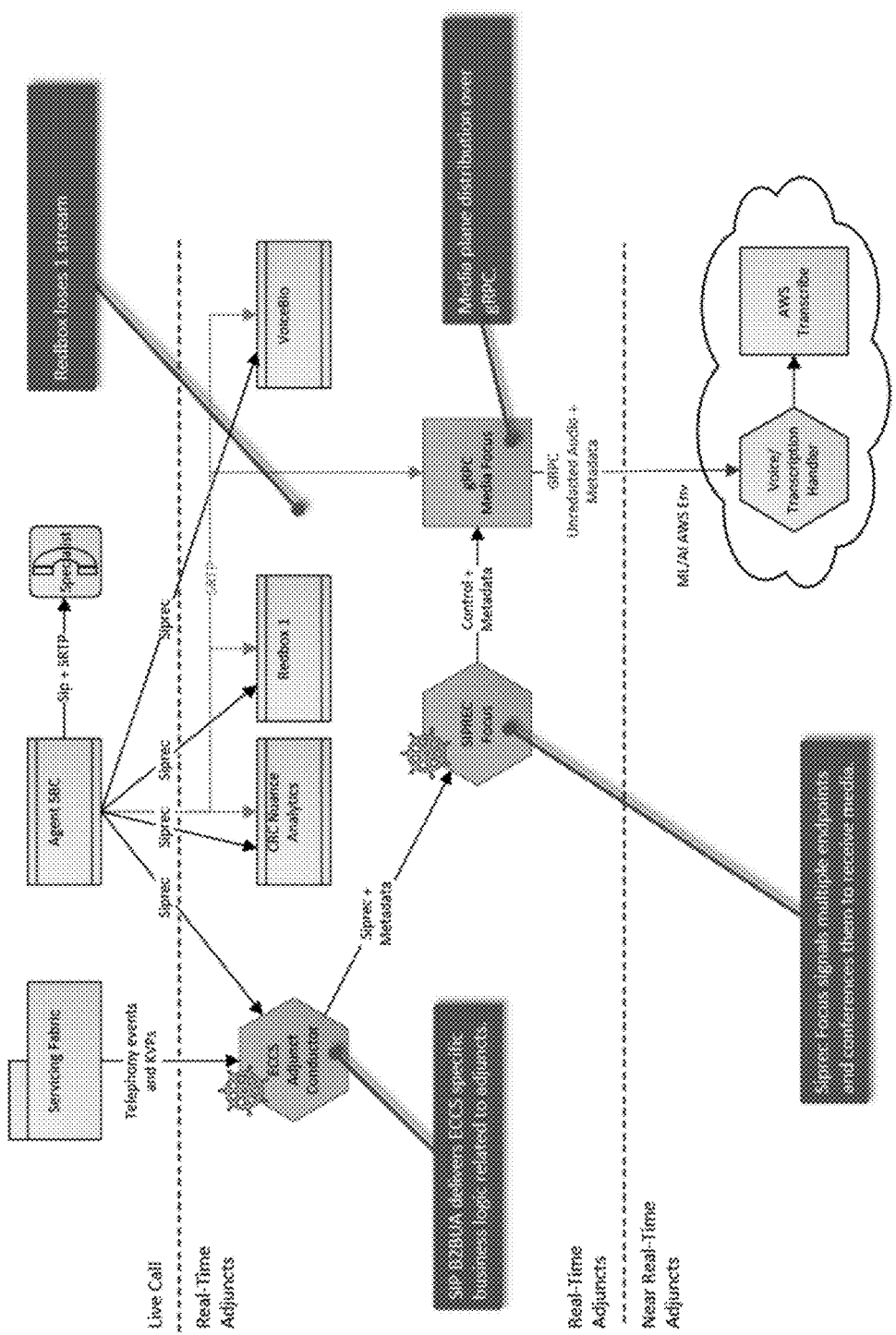
FIG. 5 is a block diagram that illustrates an implementation of a method for providing a secure conversation gateway by which an audio voice stream is made to be replicable and convertible into other media types, according to an exemplary embodiment.

Referring to FIG. 5, a block diagram 500 that illustrates an implementation of a method for providing a secure conversation gateway by which an audio voice stream is made to be replicable and convertible into other media types is shown, according to an exemplary embodiment. As illustrated in FIG. 5, when a live voice call is received, the call is initially processed by a servicing fabric, and an agent generates four SIPREC streams to be ingested by four downstream voice enabled applications illustrated in the center portion of diagram 500, labeled as Real-Time Adjuncts. The voice call may also be transferred to a voice call specialist for handling thereof.

In the Real-Time Adjuncts section of diagram 500, one of the recipients of the SIPREC stream is an Enterprise Contact Center Services (ECCS) Adjunct Conductor. The ECCS Adjunct Conductor performs several functions, including the following: 1) Determining a set of SIP/gRPC endpoints that should receive media for any new fork (i.e., pathway for forwarding the SIPREC audio data stream), including which streams should be received by which endpoints; 2) inviting a global media distributor (GMD) system and/or a SIPREC Focus (SRF) component to establish a SIPREC conference with those endpoints; 3) "parking" forks that are not in scope for real-time transcription of a particular SIPREC audio data stream by responding with inactive media; and 4) determining a set of SIP/GRPC endpoints that should receive metadata enrichment of an interactive servicing fabric (ISF) call and forwarding the metadata as SIP information.

The ECCS Adjunct Conductor then forwards the SIPREC audio stream and the metadata to the SIPREC Focus component, which is also illustrated in the Real-Time Adjuncts section of diagram 500. The SIPREC Focus component performs the following functions: 1) When a gRPC endpoint is requested, a GRPC Media Focus (GMF) node is selected to service the call. 2) GMF resources are reserved, and replies are sent. 3) SIP Information content is forwarded to GMF recipients.

The GMF node is also illustrated as a component in the Real-Time Adjuncts section of diagram 500. The GMF node performs the following functions: 1) Produce a Session Description Protocol (SDP) answer for both m-lines in the SDP offer (noting that "m-lines" refers to media description lines, each of which includes a media name and a transport address). 2) Decrypt received SRTP streams based on a crypto context provided in the SDP offer. 3) Support g.711 transcode to L16. 4) Deliver audio streams over gRPC to multiple endpoints. 5) Fill in gaps due to packet loss with silence such that delivered stream of audio is continuous, in order to avoid packet loss concealment (PLC), which is not desired. 6) Communicate timing and hold information to endpoints.

Accordingly, with this technology, an optimized process for providing a secure conversation gateway by which an audio voice stream is made to be replicable and convertible into other media types is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a secure conversation gateway, the method being implemented by at least one processor, the method comprising:

receiving, by the at least one processor, an audio voice data stream;

converting, by the at least one processor, the received audio voice data stream into a first predetermined media format; and transmitting, by the at least one processor, the converted audio voice data stream to a user, wherein the method further comprises:

segmenting, by the at least one processor, the received audio voice data stream into a plurality of audio channels; and synchronizing, by the at least one processor, each respective channel from among the plurality of audio channels with a corresponding event that relates to an ongoing communication associated with the respective channel, such that for each respective channel, the synchronizing is independent of events that relate to other channels from among the plurality of audio channels;

wherein the converting the received audio voice data stream into a first predetermined media format comprises converting the received audio voice data stream into a Session Initiation Protocol (SIP) Recording (SIPREC) format to cooperate with a Google Remote Procedure Call (gRPC) format, determining a set of SIP/gRPC endpoints that should receive media for any new pathway for forwarding the SIPRBC audio voice data stream, Including which streams should be received by which endpoints, inviting, a global media distributor (GMD) system and/or a SIPREC Focus (SRF) component to establish a SIPREC conference with those endpoints;

parking forks that are not in scope for real-time transcription of a particular SIPREC audio data stream by responding with inactive media, and determining a set of SIP/GRPC endpoints that should receive metadata enrichment of an interactive servicing fabric (ISF) call and forwarding the metadata as SIP information.

2. The method of claim 1, further comprising:
identifying, by the at least one processor, an interaction event that corresponds to content included in the received audio voice data stream;
generating, by the at least one processor, a first set of metadata based on the received interaction event; and
applying a machine learning algorithm to the received audio voice data stream and the generated first set of metadata in order to generate a response that relates to the received interaction event.

3. The method of claim 2, wherein the interaction event includes at least one from among a customer service request, a customer complaint, and a debt collection.

4. The method of claim 1, further comprising:
determining, by the at least one processor, that the received audio voice data stream conforms with a Session Initiation Protocol (SIP) Recording (SIPREC) protocol;
determining, by the at least one processor, a number of potential recipients of the received audio voice data stream, the number being less than or equal to four (4);
replicating, by the at least one processor, the received audio voice data stream into copies in correspondence with at least the determined number of potential recipients; and
transmitting, by the at least one processor, the replicated copies of the received audio voice data stream to each of the potential recipients.

5. The method of claim 1, further comprising:
determining, by the at least one processor, a number of potential recipients of the received audio voice data stream, the number being greater than four (4);
replicating, by the at least one processor, the received audio voice data stream into copies in correspondence with at least the determined number of potential recipients; and
transmitting, by the at least one processor, the replicated copies of the received audio voice data stream to each of the potential recipients.

6. The method of claim 1, further comprising:
receiving, from a voice call specialist while the received audio voice data stream is being played, a first request to pause a playing of the received audio voice data stream;
pausing the playing of the received audio stream in response to the first request;
receiving, from the voice call specialist after the playing of the received audio voice data stream has been paused, a second request to resume the playing of the received audio voice data stream; and
resuming the playing of the received audio voice data stream in response to the second request.

7. A computing apparatus for providing a secure conversation gateway, the computing apparatus comprising:
a processor;
a memory; and
a communication interface coupled to each of the processor and the memory,
wherein the processor is configured to:
receive, via the communication interface, an audio voice data stream;
convert the received audio voice data stream into a first predetermined media format; and
transmit, via the communication interface, the converted audio voice data stream to a user,
wherein the processor is further configured to:
segment the received audio voice data stream into a plurality of audio channels; and
synchronize each respective channel from among the plurality of audio channels with a corresponding event that relates to an ongoing communication associated with the respective channel, such that for each respective channel, the synchronization is independent of events that relate to other channels from among the plurality of audio channels;
wherein the convert the received audio voice data stream into a first predetermined media format comprises converting the received audio voice data stream into a Session Initiation Protocol (SIP) Recording (SIPREC) format to cooperate with a Google Remote Procedure Call (gRPC) format, the method further comprising:
determine a set of NIP/gRPC endpoints that should receive media for any new pathway for forwarding the SIPREC audio voice data stream, including which streams should be received by which endpoints;
invite a global media distributor (GMD) system and/or a SIPREC Focus (SRB) component to establish a SIPREC conference with those endpoints:
park forks that are not in scope for real-time transcription of a particular SIPREC audio data stream by responding with inactive media; and
determine a set of SIP/GRPC endpoints that should receive metadata enrichment of an interactive servicing fabric (SF) call and forwarding the metadata as SIP information.

8. The computing apparatus of claim 7, wherein the processor is further configured to:
identify an interaction event that corresponds to content included in the received audio voice data stream;
generate a first set of metadata based on the received interaction event; and
apply a machine learning algorithm to the received audio voice data stream and the generated first set of metadata in order to generate a response that relates to the received interaction event.

9. The computing apparatus of claim 8, wherein the interaction event includes at least one from among a customer service request, a customer complaint, and a debt collection.

10. The computing apparatus of claim 7, wherein the processor is further configured to:
- determine that the received audio voice data stream conforms with a Session Initiation Protocol (SIP) Recording (SIPREC) protocol;
- determine a number of potential recipients of the received audio voice data stream, the number being less than or equal to four (4);
- replicate the received audio voice data stream into copies in correspondence with at least the determined number of potential recipients; and
- transmit, via the communication interface, the replicated copies of the received audio voice data stream to each of the potential recipients.

11. The computing apparatus of claim 7, wherein the processor is further configured to:
- determine a number of potential recipients of the received audio voice data stream, the number being greater than four (4);
- replicate the received audio voice data stream into copies in correspondence with at least the determined number of potential recipients; and
- transmit, via the communication interface, the replicated copies of the received audio voice data stream to each of the potential recipients.

12. The computing apparatus of claim 7, wherein the processor is further configured to:
- receive, from a voice call specialist while the received audio voice data stream is being played, a first request to pause a playing of the received audio voice data stream;
- pause the playing of the received audio stream in response to the first request;
- receive, from the voice call specialist after the playing of the received audio voice data stream has been paused, a second request to resume the playing of the received audio voice data stream; and
- resume the playing of the received audio voice data stream in response to the second request.

13. The computing apparatus of claim 7, wherein the corresponding event includes at least one from among conferencing, transferring, and a consult.

14. A non-transitory computer readable storage medium storing instructions for providing a secure conversation gateway, the storage medium comprising executable code which, when executed by a processor, causes the processor to:
- receive an audio voice data stream;
- convert the received audio voice data stream into a first predetermined media format; and
- transmit the converted audio voice data stream to a user,
- wherein when executed by the processor, the executable code further causes the processor to:
- segment the received audio voice data stream into a plurality of audio channels; and
- synchronize each respective channel from among the plurality of audio channels with a corresponding event that relates to an ongoing communication associated with the respective channel, such that for each respective channel, the synchronization is independent of events that relate to other channels from among the plurality of audio channels;
- wherein the convert the received audio voice data stream into a first predetermined media format comprises converting the received audio voice data stream into a Session Initiation Protocol (SIP) Recording (SIPREC) format to cooperate with a Google Remote Procedure Call (gRPC) format, the method further comprising:
- determine a set of SIP/gRPC endpoints that should receive media for any new pathway for forwarding the SIPREC audio voice data stream, including which streams should be received by which endpoints;
- invite a global media distributor (GMD) system and/or a SIPREC Focus (SRE) component to establish a SIPREC conference with those endpoints;
- park forks that are not in scope for real-time transcription of a particular SIPREC audio data stream by responding with in active media; and
- determine a set of SIP/GRPC endpoints that should receive metadata enrichment of an interactive servicing fabric (ISF) call and forwarding the metadata as SIP information.

15. The storage medium of claim 14, wherein the first predetermined media format includes at least one from among a Google Remote Procedure Call (gRPC) format and a Secure Real-Time Protocol (SRTP) format.

* * * * *